Patented Aug. 21, 1945

2,383,091

UNITED STATES PATENT OFFICE 2,383,091

METHOD OF MAKING HALOGENATED ETHERS

Walter J. Toussaint, South Charleston, W. Va., and Louis G. MacDowell, Jr., Lakeland, Fla., assignors to Carbide and Carbon Chemicals Corporation, a corporation of New York No Drawing. Original application December 12, 1939, Serial No. 308,820. Divided and this application December 17, 1942, Serial No. 469,358

10 Claims. (Cl. 260—615)

This invention provides a simple and effective method for making halogenated ethers. It appears to involve a novel chemical mechanism by which halogens and olefins react with certain ethers by splitting the carbon-to-oxygen-to-carbon linkage, all as more fully hereinafter set forth. The invention will be discussed with respect to this assumed new mode of chemical action, which seems to be the most acceptable explanation of the results obtainable, but it must be understood that it is merely by way of explanation, and that the invention is not limited by any theoretical considerations advanced.

The halogenated ethers have attained an important place in industry. They have wide uses as solvents, reaction media, intermediates for the preparation of other products and for various other purposes. One of the most common of these ethers is bis-beta-chlorethyl ether, $ClCH_2CH_2.O.CH_2CH_2Cl$. This compound corresponds to diethylene glycol in which the two hydroxyl groups have been replaced by chlorine atoms. Accordingly, this ether, its homologues and analogues, may also be styled glycol dihalides for convenience. Thus, beta-chloroethyl, beta'-chloroethoxyethyl ether, $$ClCH_2CH_2.O.CH_2CH_2.O.CH_2CH_2Cl$$

may be called triethylene glycol dichloride, and related compounds can be similarly named.

The formation of the dichlorodialkyl ethers by reacting olefines, chlorine and olefine chlorhydrins in a process wherein the chlorhydrin is supplied as such or is formed by the initial reaction of water with part of the chlorine and the olefine, has been described. The new method likewise uses chlorine (or another halogen) and an olefine as starting materials, and these are caused to react on a polyether containing two or more carbon-to-oxygen-to-carbon linkages. The polyethers useful in the embodiment of this invention to which the present application is directed are the cyclic ethers, such as 1,4 dioxane and dimethyl dioxane.

The unsaturated hydrocarbons and olefines generally are useful in the method of this invention, including, specifically, ethylene and various substituted ethylenes, such as propylene, butylenes, amylenes and hexylenes. Of these, the olefines of unbranched chain structure, or those in which the side chains, if present, are short with reference to the unbranched portion, or those in which the branching occurs at a point relatively remote from the olefine linkage, are preferred. The preferred olefines, for convenience, may be termed normal olefines. In fact, some substituted ethylenes, including styrene (phenyl ethylene), vinyl chloride (monochloro-ethylene) and isobutylene (unsym. dimethyl ethylene), seem to enter into the reaction of the new method with difficulty and to only a minor extent.

The way in which cleavage of the ether linkage occurs in the practice of the invention may be illustrated by the following scheme, the particular reactants illustrated having been chosen merely for convenience:

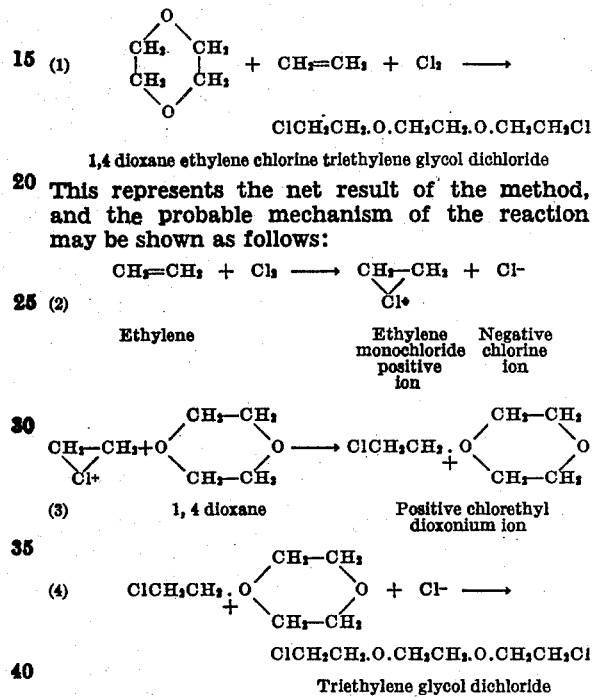

1,4 dioxane ethylene chlorine triethylene glycol dichloride

This represents the net result of the method, and the probable mechanism of the reaction may be shown as follows:

In carrying out this reaction, bis-beta-chloroethyl ether also is formed. This presumably is due to the action of chlorine and ethylene on some of the triethylene glycol dichloride first formed causing it to be split at one of the ether linkages with the resultant formation of two molecules of the lower ether.

The reaction illustrated can be conducted very simply by diffusing chlorine and ethylene into a body of the liquid 1,4 dioxane. In this case, experience has shown that good yields and efficiencies are obtained when reaction has progressed to an extent such as to cause an increase of about 75% over the original liquid volume present. This value is more or less arbitrary and represents a convenient extent of reaction rather than a critical one. Both lower and greater percentage volume increases have been used with good results. The reaction has been conducted at temperatures ranging from 20° C. to 65° C. without noticeably affecting the yield. So far as has been determined, the only temperature limitations are the freezing and boiling points of the reaction mixture. The reaction may be applied to high molecular weight solid products, and, in this event, either a solvent for the solid materials, for instance, dioxane, ethylene dichloride or the like, or temperatures above their melting points would be required. It has been found desirable at all times to maintain an excess of the olefine and a low concentration of free halogen to reduce the occurrence of substitution reactions, and to avoid the presence of explosive gaseous mixtures.

At the end of the reaction step, the products can be isolated from the reaction mixture by distillation. The actual distillation, if desired, may be preceded by the addition of a strong base to the reaction mixture to neutralize and decompose, respectively, any hydrogen halide and halogen substitution products formed by side reactions. For this purpose, aqueous sodium hydroxide, a lime suspension or any convenient base can be used. Also the concentration of halide ion can be reduced by adding an olefine oxide during the course of reaction, either continuously or intermittently. For example, in a reaction of chlorine and ethylene on 1,4 dioxane, this effect was produced by adding ethylene oxide continuously in such amounts as to neutralize the hydrogen chlorine formed. In this instance, the amount of by-product ethylene dichloride was reduced and the amount of bis-beta-chloroethyl ether was increased. The latter result was to be expected, since ethylene oxide reacts with hydrogen chloride to form ethylene chlorhydrin which, in turn, reacts with the positive ethylene monochloride ion to give bis-beta-chloroethyl ether.

The practice of the method of the invention will be illustrated by the specific examples to follow:

Example I

Chlorine and ethylene were simultaneously passed into a body of 1,4 dioxane contained in a vertical glass cylinder 30 inches tall and 3 inches in diameter and sealed at the bottom. A glass coil for the circulation of cooling water was immersed in the liquid, and the gases were admitted through two porous ceramic diffusers in the lower part of the cylinder. The gas flows were adjusted to maintain an excess of ethylene over chlorine on a molar equivalent basis, and the amount of 1,4 dioxane taken was 1000 grams.

Heat was evolved by the absorption of the gases, and the temperature of the reacting mixture was kept between 20° and 25° C. by passing cooling water through the glass coil. The only agitation of the mixture was that turbulence caused by the gases entering from the diffusers.

After 3 hours, the volume of liquid had increased by 70% of the original, and the gas flows were stopped. The liquid product weighed 1740 grams and contained 5% hydrochloric acid. The acid was neutralized by adding ethylene oxide with which it reacted to form ethylene chlorhydrin. The products were separated by distillation, first at atmospheric pressure to remove the more volatile materials, and then under reduced pressure. From the reaction mixture there was obtained 661 grams of triethylene glycol dichloride, which represents a chemical efficiency of 79% from the dioxane to this product. There were also recovered 293 grams of ethylene dichloride, 143 grams of bis-beta-chloroethyl ether, and 608 grams of 1,4 dioxane.

Example II

Chlorine and an excess of ethylene were passed into 1000 grams of 1,4 dioxane using the apparatus and procedure described in Example I. In this case the temperature was maintained between 60° and 65° C. After 8 hours, the volume of the reaction mixture had increased by 80% of the original volume and the gas flows were stopped. The reaction mixture weighed 1840 grams and contained 3% acid as hydrochloric acid. The acid in the crude product was neutralized with ethylene oxide, and the products were isolated as before.

The main product was 575 grams of triethylene glycol dichloride. In addition, 361 grams of ethylene dichloride, 113 grams of bis-beta-chloroethyl ether, and 577 grams of 1,4 dioxane were recovered. Only a little ethylene chlorhydrin was found, and 185 grams of very high boiling material were separated. This was found to contain 2,3 di(beta-chlorethoxy)dioxane, formed by reaction of ethylene chlorhydrin with 2,3 dichlorodioxane.

Example III

Chlorine and an excess of propylene were passed into 1000 grams of 1,4 dioxane using the apparatus and procedure described in Example I. After about 6 hours at a temperature of 20° to 30° C., the liquid volume had increased by 75% of the original volume, and the gas flows were stopped. The reaction mixture weighed 1873 grams and contained 5% acid as hydrochloric acid. This was neutralized with 23% aqueous sodium hydroxide solution. The mixture then separated in two liquid layers, the upper layer of which was distilled for the recovery of the products.

The principal product was 450 grams of beta-chloroisopropyl, beta'-(beta'-chloroethoxy) ethyl ether (propylene diethylene triglycol dichloride) which boiled at 110°–114° C. at an absolute pressure of 10 mm. of mercury and which had a specific gravity of 1.155 at 20° C. Quantities of lower boiling materials, including some 1,4 dioxane, also were recovered but not all of these were separated as individual substances. A part of this lower boiling material was presumably beta-chloroethyl beta'-chloroisopropyl ether (ethylene propylene diglycol dichloride).

Example IV

A mixture of 6.9 mols of 1,4 dioxane and 5.5 mols of butene-1 was stirred while chlorine gas was diffused into it at a temperature of −5° C. In 2 hours, 2.4 mols of chlorine were absorbed. The product was neutralized with aqueous caustic soda and fractionally distilled at reduced pressures.

There were isolated 84 grams (0.4 mol fraction) of beta-chlorobutyl, beta'-(beta'-chloroethoxy) ethyl ether (probably

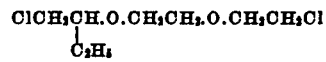

which boiled at 123°–125° C. at an absolute pressure of 10 mm. of mercury. It had a specific gravity of 1.122 at 25° C., and an index of refraction of 1.4542 at 25° C. On analysis, its chlorine content was found to be 32.9% (theory= 33.0%). The molar refraction of this substance was observed to be 51.9 (calculated=52.1). Based on the butene-1, this compound was obtained in 6.9% overall yield. Appreciable amounts of butyl and other chlorides were also formed in the reaction, but these were not isolated and identified.

*Example V*

Hexene and chlorine were added to 5.5 mols of 1,4 dioxane at a temperature of 40° to 45° C. The chlorine was introduced through a diffuser and the hexene was slowly added directly to the liquid. The hexene used boiled at 63.0° to 64.8° C. and was principally hexene-1 and some hexene-2.

In 2 hours, 2.3 mols of hexene had been added and 2.9 mols of chlorine absorbed. The mixture was then neutralized and distilled as previously described.

There were obtained 110 grams of a fraction of beta-chlorohexyl, beta'-(beta'-chloroethoxy) ethyl ether which boiled at 144°–146° C. at an absolute pressure of 10 mm. of mercury. Its density was 1.078 at 25° C., and its index of refraction was 1.4550 at 25° C. By analysis, its chlorine content was found to be 29.8% (theory=29.5%). This compound was produced in an overall yield of 24% based on the hexene-1.

Lower boiling materials also were obtained but not fully identified. Chief among these was a fraction of 160 grams of material boiling in the range of 47° to 60° C. at 10 mm. pressure. Its boiling point and its density indicated that this fraction was largely hexylene dichloride.

*Example VI*

In a larger scale practice of the method, chlorine and an excess over an equimolar ratio of ethylene were passed through separate porous ceramic diffusers into 1275 pounds of 1,4 dioxane contained in a stoneware tower. Efficient mixing of the reacting solution was secured by use of a liquid circulating system, and the temperature in the solution was maintained between 45° and 50° C. by a cooler in the liquid cycle. The gas flows and liquid circulation were continued until the volume increases of the solution attained 75%. At the end of this time, a sample distillation of the crude products showed that bis-beta-chloroethyl ether and triethylene glycol dichloride had been produced with chemical efficiencies from 1,4 dioxane of 10.5% and 69%, respectively.

Other and larger scale operations gave comparable results, and the new method has been proved excellently adapted to simple and efficient commercial practice.

Experiments similar to the foregoing have been conducted in which chlorine and styrene, chlorine and isobutylene, and chlorine and vinyl chloride were reacted with 1,4 dioxane. In every case, chlorine addition to the olefine occurred, and, in the case of vinyl chloride, some naphthodioxane,

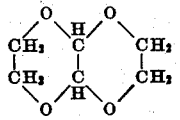

was formed. In no case, however, were sufficient amounts of the desired triethylene glycol dicloride derivatives secured to permit isolation and complete identification of these.

Chlorine and ethylene react in the manner shown with glycol ethers other than 1,4 dioxane, for example, with the various polyethylene and polypropylene glycols, with polyethylene glycol chlorhydrins and with polyethylene glycol dichlorides. Our copending application Serial No. 477,764, filed on or about March 2, 1943, is directed specifically to the embodiments of this invention which involve reactions of open chain ethers. In every case, lower molecular weight polyglycol dichlorides are obtained as the main products. The extent of degradation (ether splitting) can be varied somewhat by the amounts of chlorine and ethylene supplied to the reaction, and it varies directly with these amounts. In most cases it is preferable to carry the method to high overall yields because of the difficulty of recovering the starting materials. Chlorine and propylene are only slightly less reactive than chlorine and ethylene with respect to 1,4 dioxane, but their action on polypropylene glycols is not at all energetic. From the reaction of chlorine and propylene with dimethyl dioxane, tripropylene glycol dichloride (beta-chloroisopropyl, beta'-(beta'-chloroisopropyl) isopropyl ether), probably

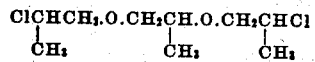

was isolated. This substance boils at about 100° C. at an absolute pressure of 5 mm. of mercury and has a density of 1.099 at 20° C. Halogens other than chlorine may, of course, be used observing the usual precautions necessary to their substitution for chlorine, although exact equivalence of action may not follow in every case, particularly in the cases of fluorine and iodine.

Various modifications of the method will be apparent, and such modifications are included within the scope of the invention as defined by the appended claims.

This application is a division of our copending application Serial No. 308,820, filed December 12, 1939.

What is claimed is:

1. Method of making halogenated ethers by splitting carbon-to-oxygen-to-carbon linkages of aliphatic cyclic ethers containing at least two such linkages in a heterocyclic ring to form halogenated open chain ethers containing no more ether linkages than the number of carbon-to-oxygen-to-carbon linkages in said cyclic ethers, which comprises causing halogen and an unsaturated hydrocarbon to react with said cyclic ethers and separating said halogenated ethers from the products of reaction, said unsaturated hydrocarbon containing an ethylenic group, C:C in which each ethylenic carbon atom has at least one hydrogen atom attached thereto, and each valence not holding a hydrogen atom holding only an aliphatic carbon atom.

2. Method of making chlorinated ethers by splitting carbon-to-oxygen-to-carbon linkages of aliphatic cyclic ethers containing at least two such linkages in a heterocyclic ring to form chlorinated open chain ethers containing no more ether linkages than the number of carbon-to-oxygen-to-carbon linkages in said cyclic ethers, which comprises causing chlorine and an unsaturated hydrocarbon to react with said cyclic ethers and separating said chlorinated ethers from the products of reaction, said unsaturated hydrocarbon containing an ethylenic group, C:C in which each ethylenic carbon atom has at least one hydrogen atom attached thereto, and each valence not holding a hydrogen atom holding only an aliphatic carbon atom.

3. Method of making chlorinated ethers by splitting carbon-to-oxygen-to-carbon linkages of aliphatic cyclic ethers containing at least two such linkages in a heterocyclic ring to form chlorinated open chain ethers containing no more ether linkages than the number of carbon-to-oxygen-to-carbon linkages in said cyclic ethers, which comprises causing chlorine and a normal olefine to react with said cyclic ethers and separating said chlorinated ethers from the products of reaction.

4. Method of making chlorinated ethers by splitting carbon-to-oxygen-to-carbon linkages of aliphatic cyclic ethers containing at least two such linkages in a heterocyclic ring to form chlorinated open chain ethers containing no more ether linkages than the number of carbon-to-oxygen-to-carbon linkages in said cyclic ethers, which comprises causing chlorine and ethylene to react with said cyclic ethers and separating said chlorinated ethers from the products of reaction.

5. Method of making chlorinated ethers by splitting carbon-to-oxygen-to-carbon linkages of aliphatic cyclic ethers containing at least two such linkages in a heterocyclic ring to form chlorinated open chain ethers containing no more ether linkages than the number of carbon-to-oxygen-to-carbon linkages in said cyclic ethers, which comprises causing chlorine and propylene to react with said cyclic ethers and separating said chlorinated ethers from the products of reaction.

6. Method of making halogenated ethers by splitting carbon-to-oxygen-to-carbon linkages in a dioxane to form halogenated ethers containing no more than two ether linkages which comprises causing halogen and an unsaturated hydrocarbon to react with a dioxane and separating said halogenated ethers from the products of reaction, said unsaturated hydrocarbon containing an ethylenic group C:C in which each ethylenic carbon atom has at least one hydrogen atom attached thereto, and each valence not holding a hydrogen atom holding only an aliphatic carbon atom.

7. Method of making chlorinated ethers by splitting carbon-to-oxygen-to-carbon linkages in a dioxane to form chlorinated ethers containing no more than two ether linkages which comprises causing chlorine and a normal olefine to react with a dioxane and separating said chlorinated ethers from the products of reaction.

8. Method of making chlorinated ethers by splitting carbon-to-oxygen-to-carbon linkages in 1,4 dioxane to form chlorinated ethers containing no more than two ether linkages, which comprises causing chlorine and ethylene to react with 1,4 dioxane and separating said chlorinated ethers from the products of reaction.

9. Method of splitting carbon-to-oxygen-to-carbon linkages of 1,4 dioxane to make triethylene glycol dichloride which comprises introducing gaseous chlorine and gaseous ethylene into a body of liquid 1,4 dioxane at a temperature between about 20° and about 65° C., the ethylene being in excess of the chlorine on a molar equivalent basis.

10. As a chemical product, beta-chloroisopropyl, beta'-(beta'-chloroethoxy) ethyl ether, a liquid boiling at 110° to 114° C. at an absolute pressure of 10 mm. of mercury and having a specific gravity of 1.155 at 20° C.

WALTER J. TOUSSAINT.
LOUIS G. MacDOWELL, Jr.